United States Patent [19]

Rozkydalek

[11] 3,862,033
[45] Jan. 21, 1975

[54] METHOD FOR SEDIMENTATION OF SOLID IMPURITIES FROM LIQUIDS

[75] Inventor: Jiri Rozkydalek, Brno, Czechoslovakia

[73] Assignee: Separa Brno, Inzenyrska Kancelar, Brno, Czechoslovakia

[22] Filed: July 17, 1972

[21] Appl. No.: 272,720

Related U.S. Application Data

[62] Division of Ser. No. 39,046, May 20, 1970, Pat. No. 3,687,298.

[30] Foreign Application Priority Data

May 22, 1969 Czechoslovakia .................. 3644-69

[52] U.S. Cl. .................................... 210/49, 210/84
[51] Int. Cl. ............................................ B01d 21/10
[58] Field of Search ........ 210/83, 84, 521, 522, 540, 210/49, 51

[56] References Cited

UNITED STATES PATENTS

| 349,990 | 9/1886 | Gaillet et al. | 210/521 |
|---|---|---|---|
| 372,216 | 10/1887 | Gaillet | 210/521 |
| 3,399,135 | 8/1968 | Conley et al. | 210/521 X |

Primary Examiner—Charles N. Hart
Assistant Examiner—Ivars Cintins
Attorney, Agent, or Firm—Murray Schaffer

[57] ABSTRACT

A multistage continuous sedimentation and separation of solids from liquids is described comprising in guiding the main stream of contaminated liquid through a succession of stages proceeding under common hydraulic pressure. In this succession liquid is caused to follow an inclined path and to pass alternately through laminar flow areas where settling of solids takes place, and through turbulent flow areas where agglomerating of finer particles, particularly under dosing of chemical coagulants, occurs. In the successive stages the upward flow rate of the liquid is progressively reduced and successively finer solids thus caused to settle therein. The progressive reducing of the liquid flow rate is achieved by regulating of withdrawal of the cleaned liquid from the single stages in a value which is equal or smaller than the minimum sedimentation rate of solids that are to be separated in the corresponding stage.

An apparatus for carrying out the multistage continuous sedimentation comprises a plurality of separate compartments having an identical cross sectional area and conforming oblique bottoms. The compartments are installed one above another in a common enclosure. The waste liquid to be cleaned is admitted to the uppermost compartment and the clarified liquid portion discharged from the top parts of the single compartments towards a common take-off level. The individual compartments are interconnected by means of overflow gaps defined by overlapping bottom sections thereof.

4 Claims, 9 Drawing Figures

PATENTED JAN 21 1975 3,862,033

METHOD FOR SEDIMENTATION OF SOLID IMPURITIES FROM LIQUIDS

The present application is a division of copending application Ser. No. 39,046, filed May 20, 1970, now U.S. Pat. No. 3,687,298.

BACKGROUND OF THE INVENTION

The present invention relates to a method and apparatus for clarifying liquids containing suspended solids.

Methods of clarifying contaminated liquids that are based on the principle of continuous gravity separation and gravity concentration of suspended solids are generally known. In most cases, these methods are carried out as one-step operations, i.e. as simple sedimentation processes from which polydisperse sludge results. In principle, it is not decisive whether the process is carried out in an one-stage device or whether it is effected in an equipment consisting of several stages that are parallelly fed and parallelly discharged.

The main disadvantage of the afore-mentioned conventional methods of simple sedimentation, as applied in industrial sewage treatment plants, is that the cleaned liquid is retained for a relatively long time in these plants. It is due to the fact that the effective through-put thereof and the retention time of the treated liquid therein depend on the polydispersion of the suspended solid phase, i.e. on the sorts, dimensions and specific weights of the solid particles. It holds here that the maximum through-put rate of the treated liquid in such a commonly used device is limited by the lowest sedimentation rate of particles that are to be separated therein. Besides, requirements on the quality of the resulting product, whether it is the clarified liquid or the concentrated sludge, can effect the actual through-put of the device, of course.

It is further generally known that by long retaining the cleaned liquid within the equipment the rate and the efficiency of the sedimentation can be reaffected in an unfavourable way. It is especially for the impurities of organic origine which decompose due to ageing or substantially change their characteristic properties. In the same way also the filtering and sludge dewatering process becomes difficult and lengthy because of the decomposition and altering of the sludge particles, as well. Moreover, there is given no possibility of successive sorting and grouping of polydisperse solids in the conventional one-step sedimentation methods and apparatuses. And sometimes, the selective grouping of polydisperse sludge can be very important from the economical point of view. Some of the particle groups may be recycled back into the manufacturing process and the other utilized in another way or treated separately, in a much easier manner.

Referring now to the equipment commonly used for effecting the continuous one-step sedimentation processes, we can only repeat what was said above on account of the clarifying methods. As the retention time of the treated liquid in the conventional apparatus is considerably long, they must be built up with an adequately large volume and, above all, with a sufficiently large horizontal flow section.

For the sake of saving the built-up surface, such apparatuses are designed in a multistage form, with several sedimentation tanks installed one above another. All the tanks are, however, operated simultaneously, independently and on the principle of simple sedimentation. All of them are fed with the waste liquid of the same quality and at the same volume rate. In a similar way even the clarified liquid is discharged parallel from the upper take-off levels of the liquid bodies in the individual tanks, while the sludge portions from the bottom parts thereof.

It stands to reason that even manufacture and assembly of the afore-mentioned bulky and voluminous devices are very expensive and demand special material and special manufacturing and assembling mechanisms. The same holds good even for the transport of these devices from the place of manufacture to the place of installation. Moreover, special treating of the overall area and reinforcing of the supporting surface are necessary because of the high weight of the device.

SUMMARY OF THE INVENTION

It is accordingly the primary object of the invention to provide an efficient and economical method of continuously clarifying liquids containing suspended solid particles under a high rate of sedimentation of impurities and in the smallest volume of equipment which is possible.

Another object of the invention is to provide a method of continuous multistage sedimentation resulting in successive sorting and selective grouping of the polydisperse solid phase.

An important object of the invention is to provide further a method of continuous multistage sedimentation in which full advantage of favourable hydrodynamic features of the waste liquid that is caused to follow an alternately descending and ascending inclined path and to pass through a set of successive stages in which laminar flow zones and turbulent flow zones alternate can be taken.

The invention is carried out with apparatus for continuously clarifying liquids in which liquid to be cleaned is caused to move on an inclined path and to pass through a succession of compartments having an identical cross sectional area and being mounted one above another in a common enclosure. All the compartments of the referred-to apparatus are operated under a common hydraulic pressure and under the flow rate of the contaminated liquid progressively decreasing from one compartment to the next compartment below so that still finer solids may settle therein and be drained off therefrom. With the decreasing flow rate of the treated liquid the through-put of the individual compartments decreases simultaneously so that the actual resulting through-put of the whole assembly can exceed the maximal through-put of these multistage apparatuses that are adapted for simple sedimentation and in which a set of sedimentation stages is operated parallelly.

A very important object of this invention is that it demands the referred-to apparatus neither large overall area nor special treating and stiffening of the area to be built up. No expensive manufacturing means and installating equipment are further necessary. The apparatus is designed to be easily assembled inside the producing plant as well as to be easily transported therefrom to the place of installation.

BRIEF DESCRIPTION OF ACCOMPANYING DRAWINGS

Other features and many attendant advantages of the invention will readily be appreciated as the same becomes better understood by reference to the following detailed description of one of the preferred embodiments, when considered in connection with the accompanying drawings, in which.

DETAILED DESCRIPTION OF THE PREFERRED EMBODIMENT

Figure 1:
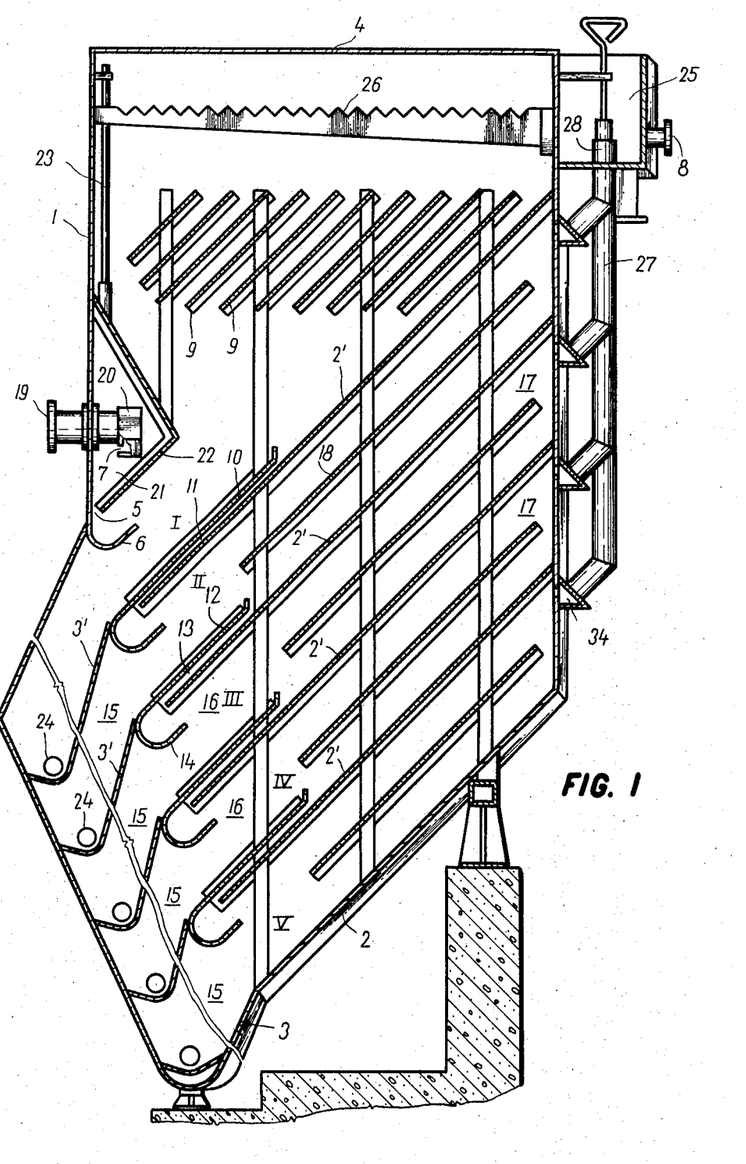
FIG. 1 is a vertical view of an apparatus adapted for five-stage continuous sedimentation of contaminated liquids, said apparatus comprising five separate compartments installed one above another in a common enclosure.

Referring now to the drawing in detail, initially to FIG. 1, an apparatus for continuously clarifying contaminated liquids has an upright annular shell 1 provided with a flat cover 4 and an oblique external bottom. The bottom consists of two sections forming an obtuse angle; an upper section 2 and a lower section 3.

The internal space of the apparatus is divided into five compartments I to V having an identical cross sectional area and being situated one above another. The single compartments are bounded by means of a set of internal bottoms that are parallel to the external bottom and conforming therewith. Similarly like the external bottom, these internal bottoms consist of two sections 2' and 3', too. The upper and lower sections of the internal bottoms do not meet each other, however. The length and height ratio of the compartments II to V is preferably greater than 3:1.

Above the upper section 2' baffles 10 are arranged in an uniform distance from the top surface of the sections. Thus, the baffles 10 overlap the lower portions of the bottom sections 2' in a vertically spaced manner and meet the bottom sections 3' to form the same angle as the sections 2 and 3 of the external bottom do.

Between the overlapping portions of the baffles 10 and the bottom sections 2 an elongated overflow gap 11 is left, these gap interconnecting the internal spaces of two adjacent compartments.

The upper edges of the baffles 10 are deflected upwardly so as to form funnel-like inlet mouths 12 of the gaps. The maximum cross sectional area of the funnel-like mouth 12 do not exceed, anyway, 60 percent of the entire cross sectional area of the compartments II to V, respectively.

To the opposite, lower ends of the baffles 10 semicircular deflector means 14 are attached, these deflector means projecting downwardly from the lines in which the baffles 10 are linked up with the bottom sections 3'.

In each of the compartments I to V three functional areas take place. They are: the sludge sumps 15, the settling areas 16 and the clarifying areas 17. In the lowermost parts of the sludge sumps 15 means 24 for removing the concentrated sludge are arranged. They may be screw conveyers, mechanical scrapers, wiper means, delivery rakes etc.

In the uppermost parts of the clarifying areas 17 of the compartments II to V overfalls 34 are provided, on the other hand. These overfalls communicate with the internal space of the compartments II to V by means of a longitudinal row of discharge orifices made in the shell 1. In the overfalls draw-off tubes 27 terminate, these tubes leading upwardly towards an adjusting receiver 25 in which a common liquid level flush with the level of the body of the liquid in the top compartment is created.

Beside the draw-off tubes 27 an overflow channel 26 mouths into the adjusting receiver 25, this channel overbridging nearly the entire inner cross section of the uppermost compartment. By means of the overflow channel 36 clarified liquid portions from the top of this compartment are discharged.

Figure 7:
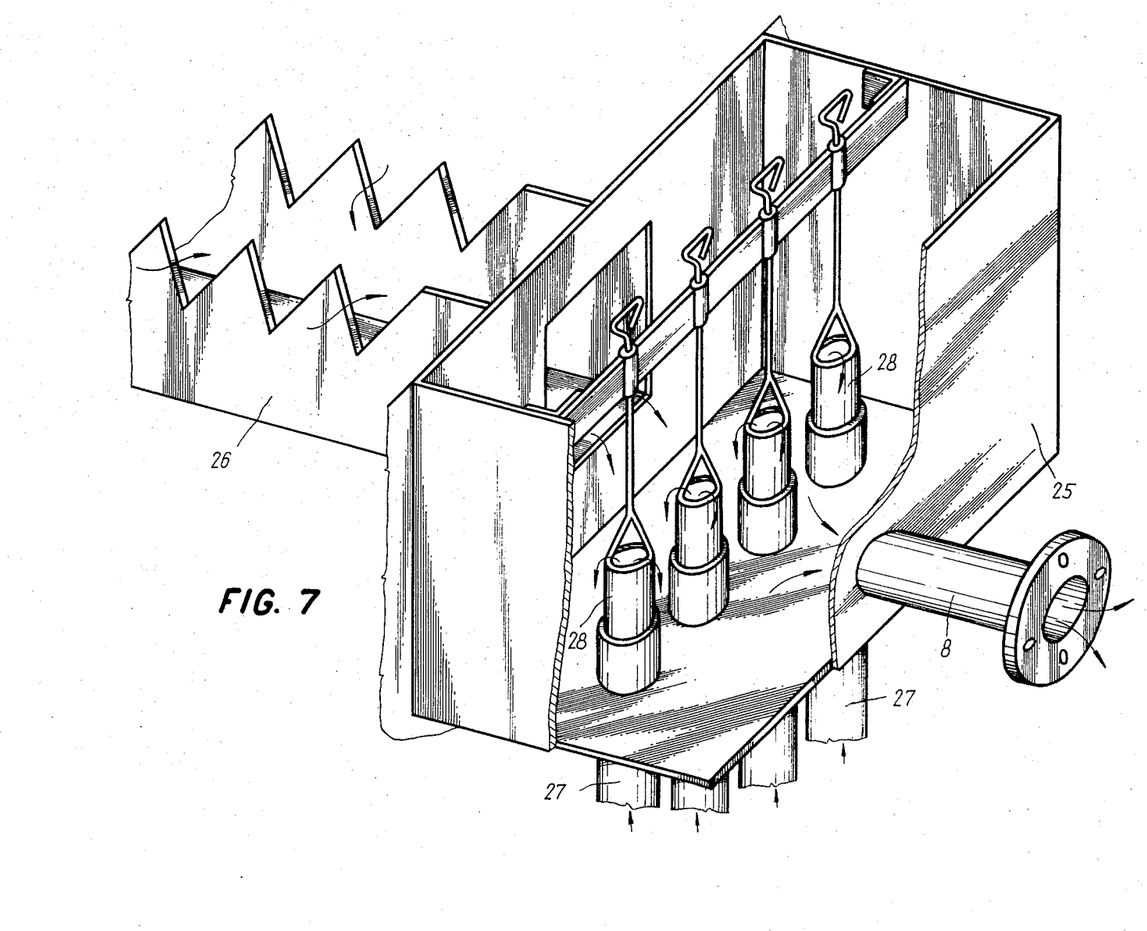
FIG. 7 is a fragmentary perspective view of an apparatus similar to that according to FIG. 1 and shows, on an enlarged scale, another modification of the outlet means for discharging the clarified liquid therefrom and for adjusting the draw-off rate of the liquid.

On the upper ends of the draw-off tubes 27 adjustable flow regulators 28 are provided. It may be, for example, elastic bellows like illustrated in FIG. 1 or sets of telescopical tube couples like illustrated in FIG. 7. In the side wall of the receiver 25 that is opposite to the mouthing of the overflow channel 26 an outlet socket 8 is further provided.

In the clarifying areas of the compartments II to V additional partition walls may preferably be built in, these partition walls 18 dividing the clarifying areas into two narrower channels, thus shortening the necessary path of the sinking particles. In a similar way, the inner space of the uppermost compartment I can be divided into a plurality of calming channels by means of a set of parallel partitions 9.

The waste water or contaminated liquid is supplied to the uppermost compartment I. It enters the same through an inlet socket 19 mouthing into a longitudinal tubular distributor 20. The distributor 20 is installed in a deaerating chamber 21 that is bounded by a profiled shield 22 and the side wall of the apparatus. It extends essentially along the entire length of this wall. In the lower portion of the side wall of the distributor 20 which faces the inner wall of the apparatus longitudinal outlet gap 7 is provided. The shield 22 is attached by its upper edge portion to the wall of the apparatus, while between the lower edge thereof and the inner wall of the apparatus an overflow gap 5 is left, this gap facing a semicircular deflector means 6.

From the upper part of the deaerating chamber 21 a deaerating tube 23 is led as far as to the atmosphere above the liquid level in the uppermost compartment.

Figure 5:
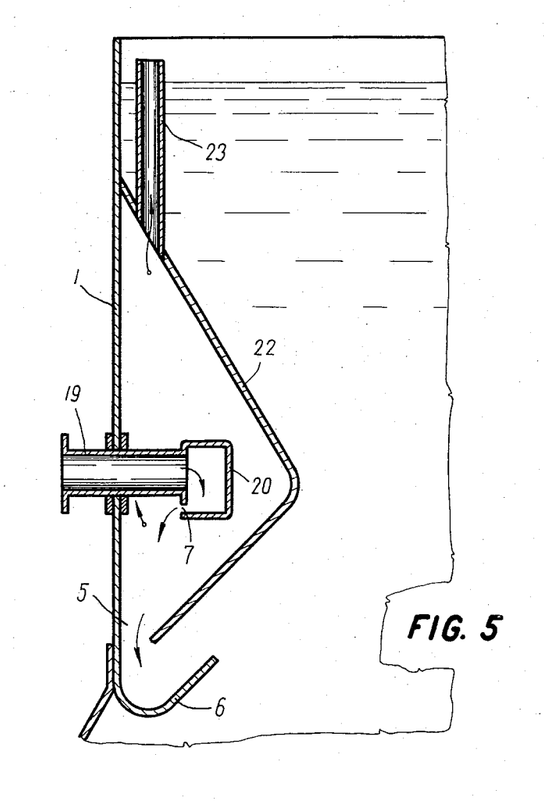
FIG. 5 is a fragmentary vertical section of still further part of the apparatus according to FIG. 1 and shows, on an enlarged scale, inlet means and distributing means for supplying and distributing the contaminated liquid into the first compartment, as well as an inlet chamber communicating with these inlet means and distributing means.
Figure 6:
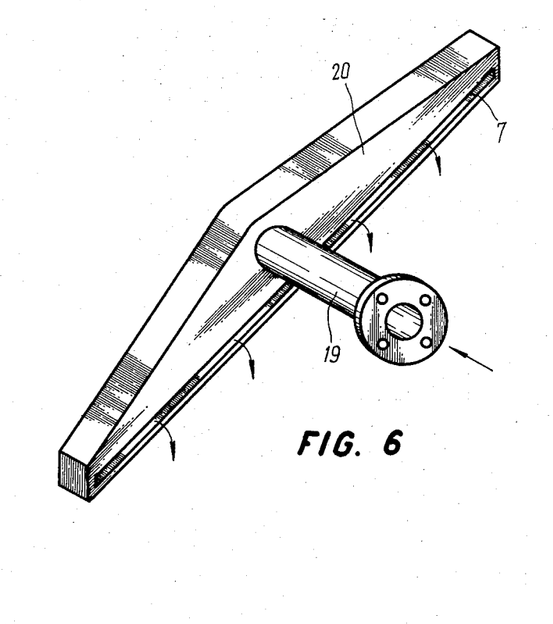
FIG. 6 is a side view showing the inlet means and the distributing means according to FIG. 5 in greater detail.

The layout both of the deaerating and liquid distributing means according to FIG. 1 is illustrated in greater detail and in a more saying way in FIGS. 5 and 6.

Figure 2:
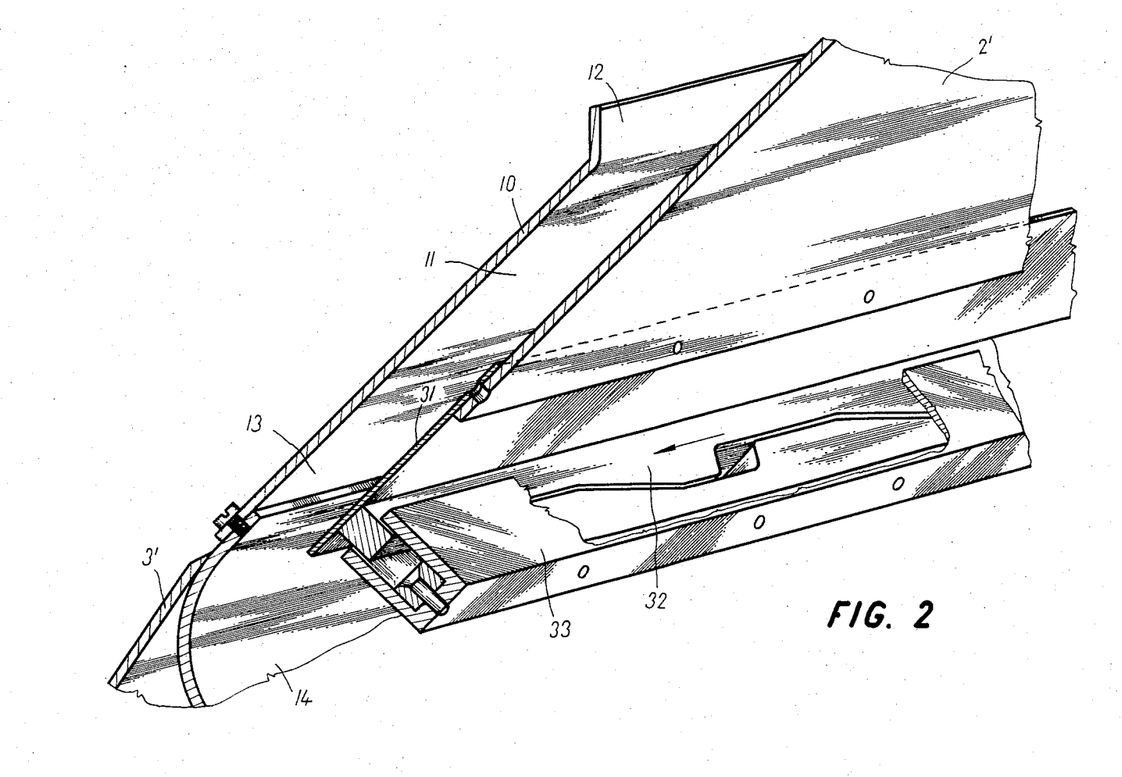
FIG. 2 is a fragmentary perspective view of the apparatus according to FIG. 1 and shows, on an enlarged scale, an overflow gap interconnecting two adjacent compartments, as well as means for adjusting the width of said gap.

In FIG. 2 means are illustrated that make the outlet mouth 13 of the overflow gaps 11 adjustable. These means consist of flexible metal sheet 31 fixed to the bottom section 2' in such a manner that it replaces the lower border thereof, and a set of sliding wedges 32 engaging the underside of the flexible metal sheet 31. When there is a necessity to make the outlet mouth 13 of the gap 11 narrower, the wedge that is nearer to the metal sheet 31 may be caused to slide along the other wedge so as to deflect the metal sheet against the baffle 10.

Figure 3:
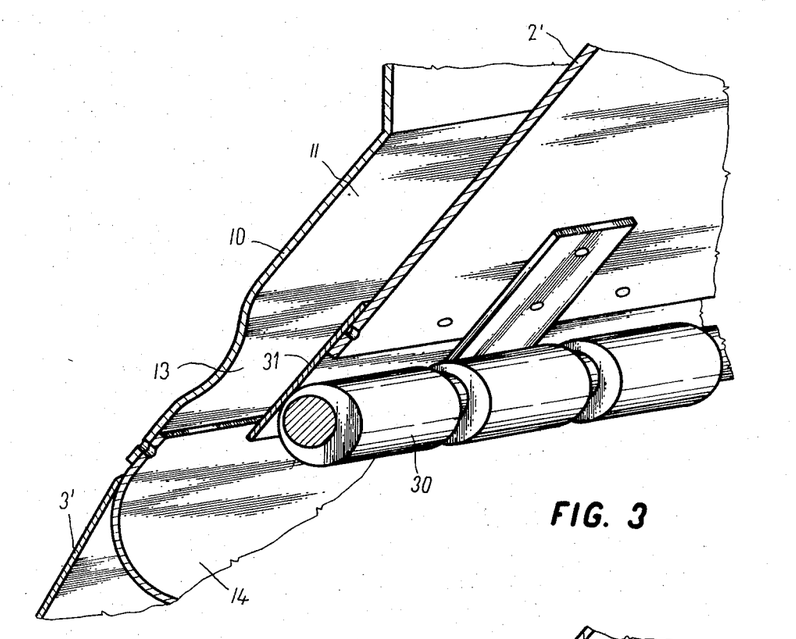
FIG. 3 is a similar perspective view of another modification of means serving for adjusting the width of the overflow gap.

FIG. 3 shows another embodiment of the means for adjusting the outlet mouth 13 of the overflow gap 11. A set of eccentric disks 30 engage the underside of the metal sheet according to this embodiment. By successive turning of the eccentric disks 30 the outlet mouth 13 may be narrowed less or more so as to form a nozzle.

Figure 4:
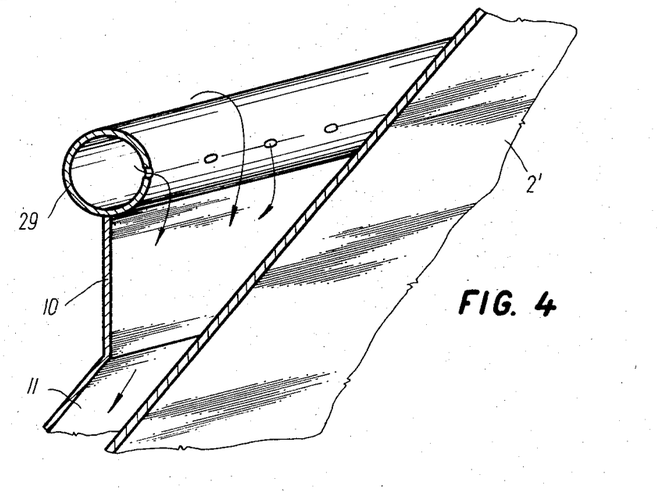
FIG. 4 is a fragmentary perspective view of another part of the apparatus according to FIG. 1 and shows, on an enlarged scale, tubular means for supplying chemical coagulants into the inlet mouth of the overflow gap.

In FIG. 4 a manifold tube 29 for supply of chemical coagulants to the contaminated liquid is represented. In the embodiment of FIG. 4 the manifold tube 29 is preferably fixed to the upper edge of the baffle 10 and is provided with a single row of distributing orifices facing the upper surface of the bottom section 2'.

The apparatus as described above with reference to the drawing is operated as follows:

The raw water or the contaminated liquid is admitted through the inlet socket 19 to the longitudinal tubular distributor 20. From there it passes through the longitudinal gap 7 into the deaerating chamber 21. In this chamber air portions absorbed in the contaminated liquid or entrained therewith may deliver due to the drop of the flow rate of the liquid. The released air portions discharge through the deaerating tube 23 towards the atmosphere above the liquid level in the top compartment.

From the deaerating chamber the calmed liquid flows uniformly through the overflow gap 5 into the settling area 16 of the uppermost compartment, where sedimentation of particles the sedimentation rate of which is higher than the upward flow rate of the treated liquid place. The concentrated sludge, collected on the bottom section 2', sinks by gravity towards the sludge sump 15.

In the settling area and particularly in the level of the inlet mouth 12 of the overflow gap 11 division of the main liquid stream is effected. The primary, main stream of the partially cleaned liquid is diverted through the overflow gap 11 into the next compartment below. Together with this primary liquid stream particles of lower sedimentation rate are carried to further sorting.

The remaining, secondary liquid stream rises with a reduced velocity towards the clarifying area 17 where additional sedimentation takes place. The cleaned liquid is drained off from the top part of the uppermost compartment by means of the overflow channel 26. By this channel the adjusting receiver 25 is fed and a common liquid level formed therein. From the receiver the cleaned liquid is discharged continuously by means of the outlet socket 8.

Similar clarifying process is effected even in the second compartment:

The main liquid stream getting out from the outlet mouth 13 of the overflow gap 11 is deflected upwardly by means of semicircular deflector 14 and ascends at a progressively reduced velocity towards the overfall 34 atop of the compartment. Particles the sedimentation rate of which is higher that the upward flow rate of the liquid sink down to the bottom, while the clarified, secondary liquid stream goes on in rising upwardly.

The same is true even for the following compartments. The main stream of the treated liquid is caused to pass with a stepwise decreasing velocity therethrough and successively finer solids thus caused to settle therein.

As a matter of fact, there are exerted two ways for successive reducing the upward flow rate of the liquid in the succession of the compartments, one of them being realized by means of regulating the withdrawal of the clarified liquid from the top parts of the compartments II to V, and the other by regulating the amount of the precleaned liquid diverted into the next compartment below. For the first effect regulators 28 are used. By means of raising or lowering the upper edge of these regulators differences between the level of the liquid body in the uppermost compartment and those of the corresponding compartments, and thus also the upward flow rate of the liquid in these compartments may be controlled.

Referring now to the upward flow rates of the liquid in the individual compartments, they are kept on about the same value during the course of the clarifying process, this value being chosen with regard to the content, sort and composition of suspended impurities and to the degree of purity required in the outgoing liquid. Besides, they depend also on the fact whether the clarified liquid or the concentrated sludge are regarded as the main, resulting product, of course.

For the sake of determining the necessary value of the upward flow of the liquid in the individual stages, and for the sake of adjusting correctly both the take-off liquid levels and the cross sectional areas of the overflow gaps in these stages, a lot of laboratory tests must be made at the beginning of the clarifying process.

Slude fractions that are deposited in the individual stages are discharged from the lowest places of the sludge sumps 15 and are delivered for further processing according to their nature and purpose of the clarifying process. For removing of the concentrated sludge either common means can be utilized, when there is no need to keep the sorted sludge components separate, or it is effected parallely, by separate and independent means.

Beside the afore-described main liquid streaming an additional liquid circulation takes place both in the settling and clarifying areas of each of the compartments, this additional liquid circulation affecting in a favourable manner the sedimentation process, as well. It results from the spontaneous sinking of the deposited sludge towards the lowest places of the sludge sumps. By the sludge moving downwardly clarified liquid is forced to flow upwardly. Under the effect of the additional liquid circulation finer particles may agglomerate and be separated. On the rise of the additional liquid circulation the arrangement of the longitudinal overflow gaps 11 and the funnel-like shaping of their inlet mouths take also considerable parts.

From what has been said above the importance of the inclined shaping of the bottom sections 2, 2' and 3, 3' can readily be understood. The optimal angle the bottom sections 2 or 2' form with the horizontal plane lies within the range from 30° to 75°. For the angle formed by the horizontal plane and the bottom sections 3 or 3' adequately lower range holds.

The oblique profile of the bottom of the apparatus is, moreover, of considerable importance even from the assembling, transporting and installing point of view.

But there is still another phenomenon that is of great importance for the favourable and efficient run of the sedimentation process. It is the fact that in the settling and clarifying areas mostly laminar flow, while in the overflow gaps turbulent flow take place. The turbulent movement of the contaminated liquid contribute to more intimate contact of solids and thus also to their unifying into agglomerates of higher sedimentation rate. The character and intensity of the turbulent flow may be affected by means of adjusting the cross sectional area of the gap and particularly by nozzle-like narrowing the outlet mouth thereof.

Further increase in the total efficiency of the continuous separation of suspended solids and an increase in the through-put rate of the liquid in the present apparatus may be achieved by changing the electro-kinetic potential of sludge particles by dosing the liquid being clarified with chemical coagulants or flocculants.

By this step, the surface interaction of particles and their unifying into agglomerates are promoted and become more brisky. To the agglomerates smaller particles of low sedimentation rate and very small particles which undergo Brownian movement and do not sediment at all may adhere and be caught thereby. In this way the sludge concentration and its filterability become better. The coagulants may preferably be dosed into the area of the turbulent flow, particularly into the inlet mouth of the overflow gap because of their better distributing into the liquid and, together with this latter, over the entire settling area so as to form a floccule cloud there. By this floccule cloud extending over whole settling area and falling slowly down therethrough smaller particles can be caught. A rule may be given that the length of the overflow gap should approximately equal to the necessary height of the floccule cloud in the compartment into which the gap mouths.

The advantage of the initial acceleration of the waste liquid supplied in the present method in the first stage is that it can be used for the rapid separation of coarsest particles with the highest sedimentation rate. In each of the subsequent stages, the upward flow rate of the main liquid stream is stepwise reduced to a value necessary for selective grouping and separating of the remaining solids at stepwise decreasing sedimentation rates. In the lowermost stage the minimum flow rate is finally achieved, under which the finest particles with the lowest settling rate can be separated. Compare this multistage sedimentation method with the condition under which the conventional one-stage devices (even if consisting of several chambers but supplied simultaneously) are operated. Such prior devices must necessarily be operated under the minimum liquid flow rate which is derived from the lowest sedimentation rate of the finest particles that are to be separated therein. It can readily be understood that the average flow rate and the average throughput that can be obtained in the present method represent multiples of those that may be possibly obtained in one-stage devices of the same builtup area.

In fact, the upward flow rate of the main liquid stream in each of the stages is successively reduced to a value which is by 5 percent lower than the sedimentation rate of particles that are to be separated in the corresponding stage.

From the above, a formula can be set for the upward flow rate of the main liquid stream in each of the stages of a multistage succession, namely:

$$w_i = w_1 (1 - [i-1]/n) \times k$$

In this formula: $n$ means the total number of stages forming a succession;

$i =$ the consecutive number of the respective stage the upward flow rate of the main liquid stream is to be estimated in;

$w_1 =$ the upward flow rate of the main liquid stream in stage 1;

$w_i =$ the upward flow rate of the main liquid stream in stage i, i.e. in any of the following stages; and $k$ represents a solid material constant; the value of this constant has to be estimated experimentally from case to case. It depends on the features of the suspension to be treated and on the composition and poly-dispersity of the solid phase that is to be separated therefrom. Besides, it depends also on the number of the separation stages.

In a five-stage device, the upward flow rates $w_1$ to $w_5$ may show the following relative values:

$w_1 = 100\%$
$w_2 = 80-60\%$
$w_3 = 70-40\%$
$w_4 = 55-15\%$
$w_5 = 35-5\%$ with a material constant k of about ($\pm$ 0.3)

Figure 8:
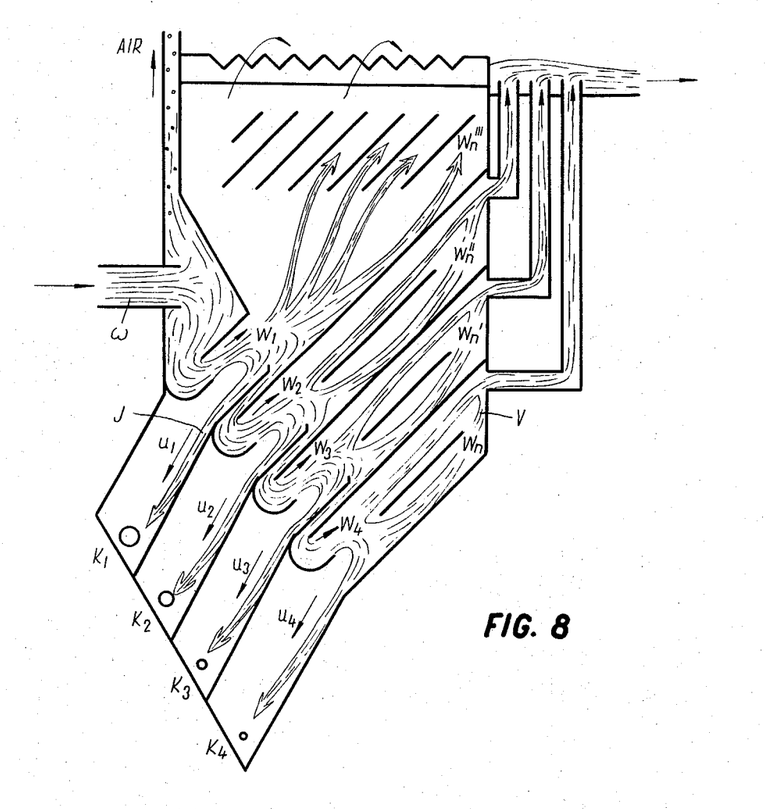
FIG. 8 is a schematic view showing the flow of liquid through a multistage device constructed in accordance with the invention.
Figure 9:
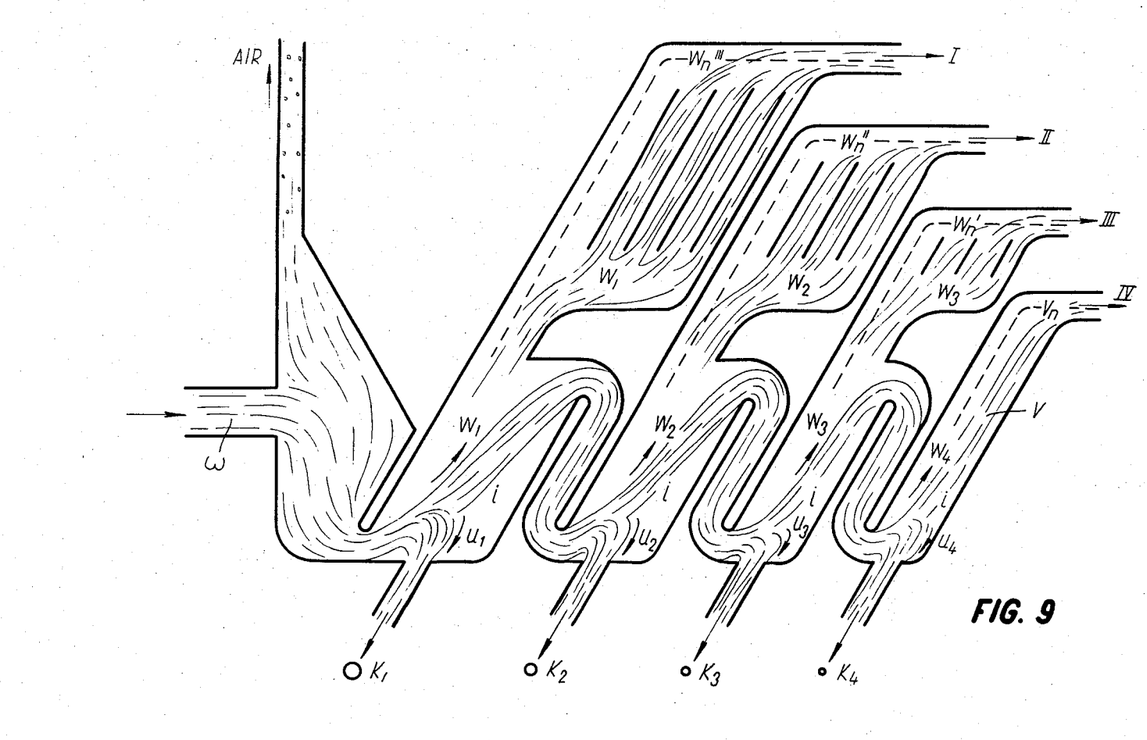
FIG. 9 is a similar view of another form of device constructed in accordance with the invention.

The formula is illustrated schematically in FIGS. 8 and 9 wherein W indicates the main liquid stream, U the settling rate and V the rate of removal of the clarified secondary stream. FIG. 8 shows the application of the method to a modified version of the apparatus in which each stage is placed next to each other in a horizontal plane. Of course, the flow paths are in the similar tortuous manner.

As will be seen from the above, there is a primary stream and a secondary stream in each of the separation stages. The primary, or main liquid stream descends generally, by gravity and/or by hydrostatic pressure along a circuitous path through the whole succession of stages. It is to be stressed that the amount of this primary liquid stream is stepwise reduced in successive stages in favor of the secondary stream formed in each of the stages. The secondary liquid streams, branching off from the main descending liquid stream to the detriment of the same, rise under continuous settling of solid particles in an inclined upward direction towards peripheral overflow devices situated in the uppermost parts of each stage. The amount and the upward flow rate of the clarified liquid withdrawn from the individual stages via the overflows are controlled separately in each of the stages, and independently on the amount discharged in the preceding or succeeding stage. The amounts and the upward flow rates of the clarified liquid in the individual stages are chosen in accordance with and in dependence upon the sedimentation rate of particles that are to be separated in these stages.

Thus, each of the stages of our apparatus runs like a separate, independently controlled sedimentation unit and the resulting cleaning effect as well as the resulting rate of the liquid at the common discharge may be derived from the summary of the horizontal cross sectional surfaces of all the stages.

The descending primary liquid stream is caused to pass alternately through turbulent areas, where agglomeration of fine particles occurs, and through laminar flow areas, where undisturbed settling of solids takes place. In the turbulent areas suitable flocculants or coagulants may be supplied to the liquid to affect favorably the agglomeration of solid particles into larger-size agglomerates with sufficient settling rate. Under the effect of coagulant agents the so called "floccular cloud" is created, representing a fluid layer consisting of flakes originating from impurities contained in raw water. By means of the floccular cloud falling down very fine particles of the solid phase can be retained and separated. This process is based on adhesion of solid particles caused by the change of the electrokinetic potential of the same.

As a matter of fact, the primary liquid stream flows alternately through agglomeration zones of two different kinds. Agglomeration on basis of hydrodynamic forces occurs in the turbulent areas. The turbulent flow brings the particles into mutual contact, thus making possible for them to mechanically adhere to one another. In the laminar flow areas an additional agglomeration process takes place as a result of dosing the liquid to be clarified with chemical coagulants of flucculants, thus changing the electro-kinetic potential of sludge particles.

The continuous method of clarifying liquids carrying suspended solids by means of multistage sedimentation and concentration of the solid phase may be utilized in chemical and food works, for cleaning of industrial or domestic sewage water or for sludge treatment plants, and preferably everywhere where polydisperse solid phase is to be separated from the liquid and assorted into the predeterminated groups.

Among other, the following application fields should further be stressed:

The referred-to method and apparatus may be utilized for sorting of kaolin and China clay, for granding of gravel and crushed stone from dust in stone pits or for concentration of sludge from wet gas separators in fire-brick plants as well as for separation of schistous from this sludge.

In the paper manufacture, the present invention may be applied for separation of so called "live pulp" from slime and filling agents, thus enabling the pulp to be recycled back into the manufacturing process. Further distillery plants, sugar industry and metallurgical industry are to be mentioned.

One of the main advantages of the present methods is the rapidity of sedimentation of impurities in the smallest volume of equipment which is possible. Due to this facts, the afore-described apparatus may be installed even in older plants where a lack of overall area exists, as well as in the open air where the conventional, commonly used apparatus cannot be utilized without danger of their getting frozen.

Beside the preferred embodiments, as shown in the accompanying drawing, a lot of further modifications can be derived within the scope of the present invention. There is given, for example, an opportunity to couple two devices similar to that according to FIG. 1 by their longer upright walls to form a double-capacity unit. Material savings which result from this assembly are apparent.

What is claimed:

1. A method of continuous sedimentation and separation of solids from a liquid stream comprising the steps of passing said stream successively through a series of independent stages operated under a common hydraulic pressure, causing said stream in each stage to follow successively a first path and then a second path, causing at least a portion of said solids to settle out in each of said stages leaving a clarified stream, removing a portion of the clarified stream in each stage after the settling of solids therein, and diverting a portion of the remaining clarified stream to the next succeeding stage and selectively regulating the removal of the clarified portion of said stream and the diverted portion of said stream from one stage to the next one, whereby the upward flow rate in successive stages is stepwise reduced, to a value which is no greater than the minimum sedimentation rate of the solids that have been separated in the preceding stage.

2. The method according to claim 1 wherein each said stage has an upwardly inclined first path and a downwardly inclined second path through which said liquid flows.

3. The method according to claim 1 including the steps of passing said liquid through turbulent and laminar separation areas, in each stage.

4. The method according to claim 1 including the step of adding a chemical coagulant to said liquid.

* * * * *